United States Patent
Eckelmann-Wendt et al.

(10) Patent No.: US 10,366,557 B2
(45) Date of Patent: Jul. 30, 2019

(54) METHOD FOR VOTING USING CONCATENATED SIGNATURES

(71) Applicant: SIEMENS MOBILITY GMBH, Munich (DE)

(72) Inventors: Uwe Eckelmann-Wendt, Wolfenbuettel (DE); Stefan Gerken, Braunschweig (DE)

(73) Assignee: Siemens Mobility GmbH, Munich (DE)

(*) Notice: Subject to any disclaimer, the term of this patent is extended or adjusted under 35 U.S.C. 154(b) by 0 days.

(21) Appl. No.: 16/088,506

(22) PCT Filed: Mar. 1, 2017

(86) PCT No.: PCT/EP2017/054745
§ 371 (c)(1),
(2) Date: Sep. 26, 2018

(87) PCT Pub. No.: WO2017/167526
PCT Pub. Date: Oct. 5, 2017

(65) Prior Publication Data
US 2019/0114860 A1    Apr. 18, 2019

(30) Foreign Application Priority Data
Mar. 29, 2016   (DE) .................. 10 2016 205 121

(51) Int. Cl.
*H04L 9/30*    (2006.01)
*H04L 9/32*    (2006.01)
*G07C 13/00*    (2006.01)

(52) U.S. Cl.
CPC ............... *G07C 13/00* (2013.01); *H04L 9/30* (2013.01); *H04L 9/3247* (2013.01); *H04L 2209/38* (2013.01); *H04L 2209/463* (2013.01)

(58) Field of Classification Search
None
See application file for complete search history.

(56) References Cited

U.S. PATENT DOCUMENTS

2013/0191642 A1    7/2013    Loughry

FOREIGN PATENT DOCUMENTS

| DE | 10301674 A1 | 11/2003 |
| FR | 2926911 A1 | 7/2009 |
| WO | 0173694 A2 | 10/2001 |

OTHER PUBLICATIONS

Durmus M.S., et al.: "A New Voting Strategy in Diverse Programming for Railway Interlocking Systems"; International Conference on Transportation, Mechanical, and Electrical Engineering Dec. 16-18, 2011. IEEE 2011. pp. 723-726.; 2011.

(Continued)

*Primary Examiner* — Kristy A Haupt
(74) *Attorney, Agent, or Firm* — Laurence Greenberg; Werner Stemer; Ralph Locher

(57) ABSTRACT

In a method for voting using concatenated signatures, a plurality M of replicants for generating M redundant messages, where M≥2, and a plurality N of voter modules, where N≥2, are provided. Each voter module has a voter for voting the redundant messages and a crypto unit with a private key fragment for signing a message. The redundant messages of the replicants are transmitted to each voter module, so that the voter of each voter module generates a voted message on the basis of the redundant messages. N private key fragments are used to generate signatures for the voted messages that are checked by a public key of a reception unit. In the event of a successful check, the repeatedly voted message is accepted.

13 Claims, 2 Drawing Sheets

(56) References Cited

OTHER PUBLICATIONS

Afzaal M., et al: "An Intrusion and Fault Tolerant Forensic Storage for a SIEM System". 2012 Eighth International Conference on Signal Image Technology and Internet Based Systems. IEEE 2012. pp. 579-586; 2012.

METHOD FOR VOTING USING CONCATENATED SIGNATURES

BACKGROUND OF THE INVENTION

Field of the Invention

The invention relates to a method for voting using concatenated signatures and to an apparatus for realizing the method.

Safety-related data must have to have been repeatedly redundantly calculated identically, wherein each type of calculation is also referred to as a channel or replicant or must have to have been checked at least redundantly in order to be considered to be fail-safe. This applies to all safety levels according to pertinent standards (e.g. IEC61508, CENELEC EN50129). A fail-safe message is produced from the repeated calculation of an item of data by means of voting. During voting, several items of data or messages received by a voter are compared with one another and a "correct" item of data is output. A voter can perform a majority decision, for instance, i.e. if a majority of inputs of a voter indicates a specific message, then this message is output. One particular fail-safe device or a fail-safe component was previously used for the voting. However, it would be more favorable for the entire system if the voters can also be realized on a non-fail-safe device, ideally on the same device as the voted messages. However, up to now proprietary hardware has been used exclusively at least at the higher safety levels for voters which do not correspond to general standards. Commercial non-fail-safe hardware could previously not be used.

SUMMARY OF THE INVENTION

The object consists in developing a method for voting messages, which calculates high safety requirements and can be realized on commercial hardware.

The inventive method for voting using concatenated signatures basically comprises the following steps: In a step a), a plurality M of replicants for generating M redundant messages is provided, wherein $M \geq 2$. In a step b), a plurality N of voter modules with $N \geq 2$ is provided, wherein each voter module has a voter for voting the redundant messages and a crypto unit with a private key fragment for signing a message. In a step c), the redundant messages of the replicants are transferred to each voter module so that the voter of each voter module generates a voted message on the basis of the redundant messages. In a further step d), a 1st signature of the 1st voted message is produced by the 1st voter module with a 1st private key fragment, if the 1st voter generates a 1st voted message. In a further step e), an n'th signature and an n'th voted message is transferred from the n'th voter module to the (n+1)'th voter module. In a further step f), the message voted by the (n+1)'th voter is compared with the n'th voted message and a (n+1)'th signature is produced on the n'th signature with a (n+1)'th private key fragment of the (n+1)'th voter module, if the n'th voted message agrees with the (n+1)'th voted message. In a further step g), the steps e) and f) are performed in ascending sequence for each n with $1 \leq n \leq (N-1)$. In a further step h), the N'th signature and the N'th voted message is transferred to a receiver unit. In a further step i), the N'th voted message is accepted by a receiver crypto unit, if the receiver crypto unit successfully checks the N'th signature with a public key.

By means of the inventive method, the principle of the voting is combined with crytographic methods. This always requires a voting of a level to be successful and in agreement with the voting result of the primary stage. Without this requirement, a partial signature is not carried out by a key fragment. Only when all the signatures are present, however, does the public key then "match" the signature generated by the key fragment and the voted message is then accepted by the receiver unit. In other words, a receiver unit is a verification unit, a verification device or a receiver. High security for the voted message is generated by means of the concept of concatenated signing. The invention is also advantageous in that the method can be realized on non-fail-safe hardware such as, for instance, on standard PCs.

All private key fragments preferably differ from one another.

The signatures are preferably formed on a hash value of the message. As a result, the data volume of longer messages is advantageously reduced and the process of concatenated signing can ensue more quickly.

A private key is preferably produced by multiplying the private key fragments in the residue class and the public key multiplied by the resulting private key is produced in the residue class 1, wherein as a result the original hash value or the original message is retained again. This is a preferred and particularly rapid realization of the signature. The original hash value or the original message can then be checked by the receiver unit.

The private key can preferably be calculated commutatively from the private key fragments. In other words, it means that it does not depend on the sequence of the signing. The sequence of the verifying voter modules is therefore irrelevant, provided all voter modules are involved. Advantageously the transfer of the voted message of the n'th voter module to the (n+1)'th voter module is synchronized with the transfer of the redundant messages of the plurality of replicants (R1, R2, RN) to the (n+1)'th voter module, wherein $1 \leq n \leq (N-1)$. As a result, the temporal delay in the concatenated signing is reduced.

Each voter is preferably separated from the other voters. This means that the same techniques are applied, in the same way as replicants are segregated, or in other words encapsulated or isolated. The independence of the calculation paths is achieved as a result. A suitable encapsulation of the voter modules can be achieved for instance by colored emulators for SIL3 or SIL4, wherein SIL refers to the safety integrity level. This is also advantageous if the aim is to realize the method on standard PCs.

The voters can be realized as discriminator voters or as majority voters. Discriminator voters only output a voted message if all inputs agree. Majority voters form a majority decision, i.e. when a majority of the messages are in agreement, then this message is output.

A voter preferably outputs no message or a negative message if it is not able to form a voted message.

The transfer of the voted messages from the n'th voter module to the (n+1)'th voter module preferably proceeds without interruption, wherein $1 \leq n \leq (N-1)$. As a result, the duration of the signing is reduced.

Each redundant message of the respective replicant can advantageously be identified with regards to security. This can take place, for example, by means of a checksum with replicant identification.

Furthermore, an apparatus for performing the method for voting using concatenated signatures is also proposed. The apparatus comprises a plurality M of replicants for generating M redundant messages with $M \geq 2$. Furthermore, a plurality N of voter modules is provided with N≥2, wherein each voter module has a voter for voting the redundant messages and a private key fragment for signing a message, wherein the inputs of each voter are connected with the outputs of each replicant. The output of each n'th voter module is connected to the input of each (n+1)'th voter module for transmitting voted messages and signatures, wherein 1≤n≤(N−1), and a receiver unit is provided, which receives the signature and voted message output by the N'th voter module and checks the N'th signatures with a public key.

A computer program is also proposed, which enables a data processing facility, once it has been loaded into the storage means of the data processing facility, to perform a method for voting using concatenated signatures.

Furthermore, a computer-readable storage medium is also proposed, on which a program is stored, which enables a data processing facility, once it has been loaded into the storage means of the data processing facility, to perform a method for voting using concatenated signatures.

The above-described properties, features and advantages of this invention and the manner in which these are achieved will be described more clearly and explicitly in conjunction with the following description of the exemplary embodiments, which are explained in more detail with the drawings, in which:

DESCRIPTION OF THE INVENTION

Figure 1:
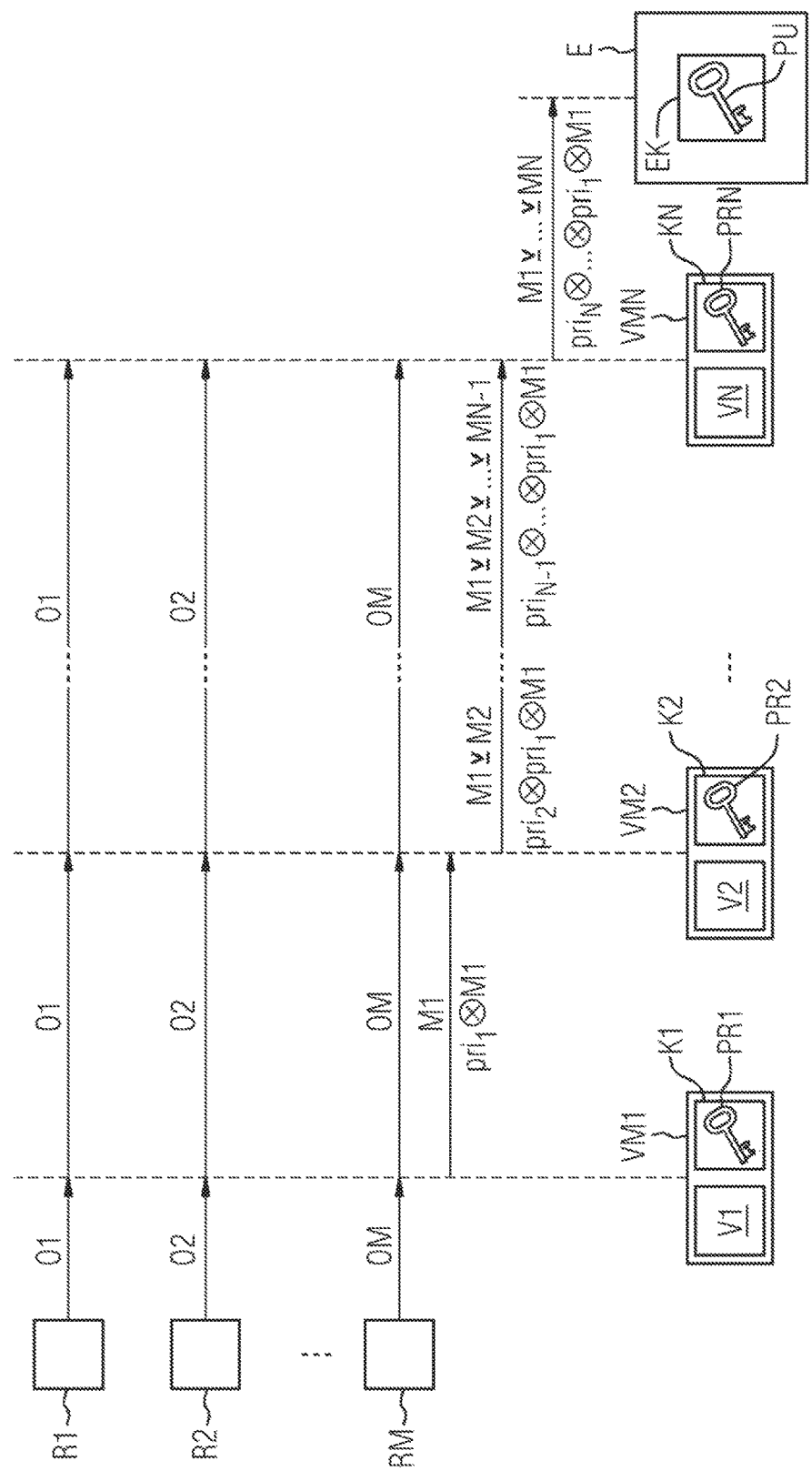
FIG. 1 shows a representation of the method for voting using concatenated signatures according to an exemplary embodiment.

FIG. 1 shows a method for voting using concatenated signatures according to an exemplary embodiment. Provision is made in each case for a plurality M of replicants R1, R2, RM for generating M redundant messages O1, O2, OM, with M≥2. These redundant messages O1, O2, OM are equivalent in terms of content (identical in terms of meaning). Moreover, a plurality N of voter modules VM1,VM2, VMN is provided, wherein each voter module VM1,VM2, VMN has a voter V1,V2,VN for voting the redundant messages O1, O2, OM and a crypto unit K1,K2,KN with a private key fragment PR1,PR2,PRN for signing a message.

The redundant messages O1, O2, OM of the replicants R1,R2,RM are transferred to each voter module VM1,VM2, VM3, so that the voter V1,V2,VN of each voter module VM1,VM2,VMN generates a voted message on the basis of the redundant messages. In FIG. 1, this is indicated graphically, by way of example, by vertical, dashed lines on each voter module VM1,VM2,VMN, on which in each case the redundant messages O1, O2, OM are shown by means of illustrated arrows.

A 1st signature of the 1st voted message M1 is then produced by the 1st voter module VM1 with a 1st private key fragment PR1, if the 1st voter V1 generates a 1st voted message M1. In this regard, the 1st signature is applied by the key operator or key value $pri_1$ of the 1st private key fragment PR1 to the voted message M1 or alternatively to a hash value of the message, which is shown in the Figure with $pri_1 \otimes M1$. This 1st signature is then transferred with the 1st voted message M1 to the 2nd voter module VM2. In this 2nd voter module VM2, a 2nd voted message M2 is now produced by the 2nd voter V2 on the basis of the redundant messages O1,O2,OM of the replicants R1, R2, RM. This 2nd voted message is compared with the 1st voted message M1. In case of agreement, a 2nd signature is then produced by means of a 2nd private key fragment PR2 on the 1st signature, which is shown by $pri_2 \otimes pri_1 \otimes M1$ with the operation $\otimes$. This 2nd signature is then transferred with either the 1st voted message M1 or the 2nd voted message M2. Since the two voted messages M1, M2 have to agree as a requirement for the signing, it is immaterial which of the two is forwarded. This is shown in FIG. 1 by the exclusive logical contravalence symbol $\vee$, which corresponds to an "either or". For instance, the 1st voted message M1 can be used for transfer purposes.

This method is now forwarded in this form for the further voter modules VM1, VM2, VMN. In general, it may therefore be stated that an n'th signature and an n'th voted message is transferred from the n'th voter module to the (n+1)'th voter module. The message voted by the (n+1)'th voter is then compared with the n'th voted message and a (n+1)'th signature is produced on the n'th signature with a (n+1)th private key fragment of the (n+1)'th voter module if the n'th voted message is in agreement with the (n+1)'th voted message. This is performed in ascending sequence for each n with 1≤n≤(N−1).

In the last step, an N'th signature is therefore produced by the N'th private key fragment PRN on the (N−1)th signature, which is shown in FIG. 1 by $pri_N \otimes \ldots \otimes pri_1 \otimes M1$ with the operation $\otimes$.

Accordingly the N'th signature and the N'th voted message MN (or also another agreeing voted message) is transferred to a receiver unit E. Here the N'th voted message MN is accepted by a receiver crypto unit EK, if the receiver crypto unit EK successfully checks the N'th signature with a public key PU.

This method can be described mathematically below. A private key PR, referred to below with pri, is produced as a link between the private key fragments PR1, PR2, PRN, with $pri_n$, referred to with 1≤n≤N, by means of an operation $\otimes$, so that $pri_N \otimes \ldots \otimes pri_1 = pri \bmod a^l$ In other words, the private key PR is not prime, since it can be shown as a link between several key fragments P1, P2, PN. The private key PR is then produced with the public key PU, referred to here as pub, by linking the neutral element 1 in the residue class, in other words $pri \otimes pub \equiv 1 \bmod a^l$, wherein a represents the number of possible values per sign, 1 the underlying character length, $a^l$ the number of keys which differ from one another and ≡ the congruence. The private key PR and the public key are accordingly modularly inverse to one another with respect to the link $\otimes$. Typically processors operate in the binary system, which therefore corresponds to a=2 and is the preferred variant. The bit length 1 typically lies at between 128 to 160 bits, but shorter or longer bit lengths and therefore shorter and longer keys can however be used.

If a signature of a private key fragment Pr1, Pr2, PRN was now to be missing, then the receiver unit E would not then succeed in recovering the original message. High security for the voted message is generated by means of the concept of concatenated signing. The method can be realized on non-fail-safe hardware such as, for instance, standard PCs. By means of the inventive method, the principle of voting is combined with crytographic methods. This always requires a voting of a level to be successful and agrees with the voting result of the primary stage. Without this requirement, a partial signature will not take place by means of a key fragment. Only when all the signatures are present, however, does the public key then "match" the signature generated by the key fragment and the message is then accepted by the receiver unit E.

Various expedient operations are considered as links ⊗. For instance, matrix links are also included. The sequence of signatures is then essential, for instance, and can generally not be interchanged. All private key fragments Pri1, Pr2, PrN also differ from one another. The signatures are preferably formed on a hash value of the message. As a result, the data volume of longer messages is advantageously reduced and the process of concatenated signing can ensue more quickly.

A private key PR nevertheless preferably results by multiplying the private key fragments PR1, PR2, PRN in the residue class. The public key PU multiplied by the resulting private key PR results in the residue class 1, wherein as a result the original hash value or the original message is obtained again. This is a preferred and particularly rapid realization of the signature. The original hash value or the original message can then be checked by the receiver unit E, for instance by the hash value being calculated with the corresponding hash function from the voted message and being compared with the transferred hash value after applying (multiplying) all private key fragments.

The private key PR should preferably be commutatively calculable from the private key fragments PR1, PR2 PRN. The sequence of the verifying voter modules VM1,VM2, VM3 is therefore irrelevant, provided at least all voter modules VM1,VM2,VM3 are participating. This is the case for instance with the afore-described multiplication.

A synchronization can additionally take place. It is useful for an easy temporal course of the signing if the transfer of the voted message of the n'th voter module to the (n+1)'th voter module is synchronized with the transfer of the redundant messages (O1,O2,OM) of the plurality of replicants (R1, R2, RN) to the (n+1)'th voter module, wherein $1 \leq n \leq (N-1)$. As a result, the temporal delay in the concatenated signing is reduced.

Each voter V1, V2, VN is preferably separated from the other voters V1, V2, VN. This means that the same techniques are applied here, in the same way as replicants R1,R2,RM are segregated, or in other words encapsulated or isolated. As a result, the independence of the calculation paths is achieved, as a result of which the risk of identical error outputs is significantly reduced. A suitable encapsulation of the voter modules can be achieved for instance by colored emulators for SIL3 or SIL4, wherein SIL refers to the safety integrity level. This is also advantageous if the aim is to realize the method on standard PCs.

The voters V1,V2,VN can be configured as discriminator voters or as majority voters. Discriminator voters only output a voted message if all inputs agree. Majority voters form a majority decision, i.e. when a majority of the messages agree, then this message is output. A voter V1,V2, V3 preferably outputs no message or a negative message if it is not able to form a voted message. This would then be the case, for instance, if a majority voter has precisely two messages which contradict one another, however. In the case of a discriminator voter, it would also be the case if an input message deviates from the remainder. The transfer of the voted messages from the n'th voter module to the (n+1)'th voter module preferably proceeds without interruption, wherein $1 \leq n \leq (N-1)$.

Advantageously, each redundant message O1, O2, OM of the respective replicant R1, R2, RM can be identified in a safety-related manner. This can take place, for example, by means of a checksum with replicant identification. As a result, the malfunctioning of a replicant R1, R2, RM can be identified, for instance.

Figure 2:
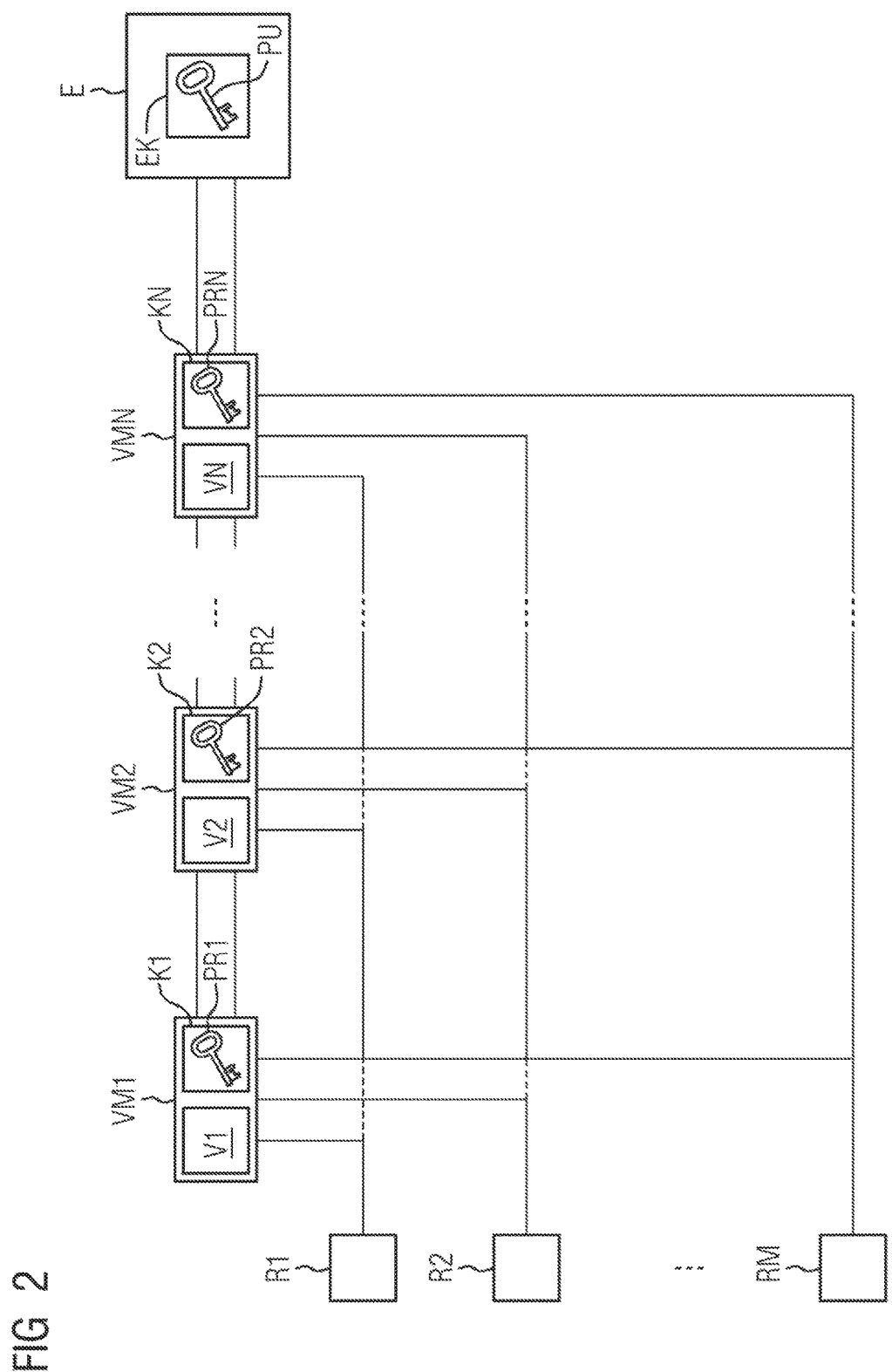
FIG. 2 shows a representation of an apparatus for voting using concatenated signatures according to an exemplary embodiment.

FIG. 2 shows a schematic representation of an apparatus for voting using concatenated signatures. Here a plurality M of replicants R1,R2,R3 for generating M redundant messages, where $M \geq 2$, is made available. Moreover, a plurality N of voter modules VM1,VM2,VMN, where $N \geq 2$, is present. Here each voter module VM1,VM2,VMN is equipped with a voter V1,V2,VN for voting the redundant messages O1,O2,OM of the redundant replicants R1, R2, RM and a crypto unit K1, K2, KN with a private key fragment PR1, PR2, PRN for signing a message, wherein the inputs of each voter module VM1,VM2, VMN are connected to the outputs of each replicant R1, R2, RN. The output of each n'th voter module is connected to the input of each (n+1)'th voter module for transmitting voted messages and signatures, wherein $1 \leq n \leq (N-1)$, and a receiver unit E is provided, which receives the signature and voted message output by the N'th voter module and checks the N'th signature with a public key PU.

In summary, a method for voting is proposed, which is combined with (asymmetric) cryptographic methods. Here concatenated signatures are used at several levels. The prerequisite here is for a voting of a level to be successful and agree with the voting result of the primary stage. Without this prerequisite, a partial signature is not carried out by a key fragment. Only when all the signatures are present, however, does the public key then "match" the signature generated by the key fragment and the message is then accepted by the receiver unit E. High security for the voted message is generated by means of the concept of concatenated signing. As a result, the method can be realized on non-fail-safe hardware such as, for instance, standard PCs.

Although the invention has been illustrated and described in detail based on preferred exemplary embodiments, the invention is not restricted by the examples given and other variations can be derived therefrom by a person skilled in the art without departing from the protective scope of the invention.

LIST OF REFERENCE SIGNS

R1,R2,RM replicants
O1,O2,OM redundant messages
VM1,VM2,VM3 voter module
K1,K2,KN crypto unit
PR1,PR2,PRN private key fragment
PR private key
E receiver unit
EK receiver crypto unit
PU public key
M1,M2, MN voted message

The invention claimed is:

1. A method for voting using concatenated signatures, which comprises the following steps of:
   a) providing a plurality M of replicants for generating M redundant messages, where $M \geq 2$;
   b) providing a plurality N of voter modules, where $N \geq 2$, wherein each of the voter modules has a voter for voting the redundant messages and a crypto unit with a private key fragment for signing a message;
   c) transferring the redundant messages of the replicants to each of the voter modules, so that the voter of each of the voter modules generates a voted message on a basis of the redundant messages;

d) producing a 1st signature of a 1st voted message by means of a 1st voter module of the voter modules with a 1st private key fragment, if the 1st voter generates the 1st voted message;

e) transferring an n'th signature and an n'th voted message from an n'th voter module of the voter modules to an (n+1)'th voter module of the voter modules;

f) comparing a message voted by an (n+1)'th voter with the n'th voted message and producing a (n+1)'th signature on the n'th signature with a (n+1)th private key fragment of the (n+1)'th voter module if the 1st voted message agrees with an (n+1)'th voted message;

g) performing the steps e) and f) in ascending sequence for each n where $1 \leq n \leq (N-1)$;

h) transferring the n'th signature and the n'th voted message to a receiver unit; and i) accepting the n'th voted message by a receiver crypto unit, if the receiver crypto unit successfully checks the n'th signature with a public key.

2. The method according to claim 1, wherein all private key fragments differ from one another.

3. The method according to claim 2, which further comprises:
producing a private key by multiplying the private key fragments in a residue class; and
multiplying the public key by the private key in a residue class 1, wherein as a result an original hash value or an original message is obtained again.

4. The method according to claim 1, which further comprises forming signatures on a hash value of the message.

5. The method according to claim 1, which further comprises commutatively calculating a private key from the private key fragments.

6. The method according to claim 1, which further comprises synchronizing in time a transfer of the voted message of the n'th voter module to the (n+1)th voter module with a transfer of the redundant messages of the plurality of replicants to the (n+1)th voter module, wherein $1 \leq n \leq (N-1)$.

7. The method according to claim 1, wherein each said voter is separated from other voters.

8. The method according to claim 1, wherein voters are embodied as discriminator voters or as majority voters.

9. The method according to claim 1, wherein each said voter does not generate the message or a negative message if the voter is not able to form a voted message.

10. The method according to claim 1, wherein a transfer of voted messages from the n'th voter module to the (n+1)'th voter module proceeds without interruption, wherein $1 \leq n \leq (N-1)$.

11. The method according to claim 1, wherein with each redundant message a respective replicant is identified in a safety-related manner.

12. An apparatus for performing a method for voting using concatenated signatures, the apparatus comprising:
a plurality M of replicants for generating M redundant messages, where $M \geq 2$;
a plurality N of voter modules, where $N \geq 2$, wherein each of said voter modules has a voter for voting the redundant messages and a private key fragment for signing a message, wherein inputs of each said voter are connected with outputs of each replicant;
an output of each n'th voter module of said voter modules is connected to an input of each (n+1)'th voter module of said voter modules for transmitting voted messages and signatures, wherein $1 \leq n \leq (N-1)$;
a receiver unit for receiving a signature and voted message output by said n'th voter module and checks an n'th signature with a public key.

13. A non-transitory computer-readable storage medium containing computer executable instructions, the computer executable instructions being loaded into a memory of a data processing facility for performing the method according to claim 1 for voting using the concatenated signatures.

* * * * *